United States Patent
Lee et al.

(10) Patent No.: US 7,486,933 B2
(45) Date of Patent: Feb. 3, 2009

(54) MULTI-PATH INTERFERENCE REMOVING FOR WIRELESS RELAY SYSTEM APPARATUS AND METHOD USING BY SAME CHANNEL FREQUENCY

(75) Inventors: Seong Jae Lee, Seoul (KR); Ju Tae Song, Seoul (KR); Hyun Kang, Seoul (KR)

(73) Assignee: RF Windows Co., Ltd, Seoul (KR)

( * ) Notice: Subject to any disclaimer, the term of this patent is extended or adjusted under 35 U.S.C. 154(b) by 504 days.

(21) Appl. No.: 11/124,295

(22) Filed: May 9, 2005

(65) Prior Publication Data

US 2006/0013183 A1    Jan. 19, 2006

(30) Foreign Application Priority Data

Jul. 14, 2004    (KR) ............... 10-2004-0054727

(51) Int. Cl.
*H04B 1/10* (2006.01)
*H04B 15/00* (2006.01)

(52) U.S. Cl. ............... 455/63.1; 455/311; 455/67.13; 455/501

(58) Field of Classification Search ............... 455/67.11, 455/226.1, 63.1, 67.13, 132, 296, 133, 134, 455/135, 136, 137, 65, 311, 226.3, 11.1, 455/20, 501; 370/343, 342; 375/148, 150, 375/136, 130
See application file for complete search history.

(56) References Cited

U.S. PATENT DOCUMENTS

| | | | |
|---|---|---|---|
| 6,473,415 B1* | 10/2002 | Kim et al. ............... | 370/342 |
| 2002/0172265 A1* | 11/2002 | Kenney ............... | 375/148 |
| 2005/0141594 A1* | 6/2005 | Smith et al. ............... | 375/130 |
| 2008/0019422 A1* | 1/2008 | Smith et al. ............... | 375/136 |

* cited by examiner

*Primary Examiner*—John J. Lee
(74) *Attorney, Agent, or Firm*—Laurence A. Greenberg; Werner H. Stemer; Ralph E. Locher

(57) ABSTRACT

Embodies of peripheral a wireless relay system apparatus and method for a multi-path interference removing using by same channel frequency is shown and described, which purpose of the present invention is to overcome extension of service coverage and a dead spot with amplifying same channel frequency, a problem in doing the relay, system wireless relay system was a same frequency interference of RF (Radio Frequency) output is become feedback radiating from tx antenna to rx antenna of the relay system, the wireless relay system apparatus and method effectively eliminates the same frequency interference so that it can ensure an additional system gain and easy to set up relatively to general same frequency relay system.

8 Claims, 6 Drawing Sheets

Cancellation OFF Status

Cancellation ON Status

MULTI-PATH INTERFERENCE REMOVING FOR WIRELESS RELAY SYSTEM APPARATUS AND METHOD USING BY SAME CHANNEL FREQUENCY

TECHNICAL FIELD

The present invention relates a wireless relay system apparatus and method for a multi-path interference removing using by same channel frequency, which purpose of the present invention is to overcome extension of service coverage and a dead spot with amplifying same channel frequency, a problem of the relay system is a same channel frequency interference of RF (Radio Frequency) output which is become feedback radiating from tx (transmission) antenna to rx (reception) antenna of the relay system, the wireless relay system apparatus and method effectively eliminates the same frequency interference so that it can ensure an additional system gain and easy to set up relatively to general same frequency relay system.

BACKGROUND ART

This present invention relates to a wireless relay system apparatus and method for a multi-path interference removing using by same channel frequency. More specifically, the invention relates to a relay system apparatus and method to relay wireless signal of high generating power and high purity for tx (transmission) and interference isolation of relay branch office.

The relay system is located between a base wireless station and a terminal, which is an apparatus to provide for a good quality of communications entering the power station environment by amplification of low rx (reception) level in a dead spot such as an inside of building or out of town.

DISCLOSURE OF INVENTION

Technical Problem

Types of the replay system have been included optical relay system, microwave relay system, frequency conversion relay system, RF relay system, and so on about a wireless relay system which have been repeated using by same channel frequency, in general, a case of an optical relay system has captured RF signal and converted into optic signal and transmitted it to via optic cable from cell site, which was a cause of a high cost by via optic cable and the limit of installation for an additional optical conversion module, and a microwave relay system has been needed a microwave conversion module because its rx was using a microwave between the cell site and the relay system, after installation of microwave conversion module, there was a limit of the use of the microwave relay system for a quality of service because of snowing, raining, fogging, and so on. Also, a frequency conversion relay system has been used a different channel between the cell site and the relay system, which was a cause of frequency consuming in an additional frequency conversion module and wave efficiency.

In other hand, a case of the relay system replaying same channel frequency has been a cost-effective but the relay system has been a limit of installation because of isolation between tx/rx and increasing of base wireless station interference.

Summarily, therefore, conventional relay system features means for improving isolation of the relay site to be installed a relay to radiate from tx/rx antenna and limitation of use of near far isolating operation. This approach purposely controls and limits the isolation of the relay.

What is still needed is a durable, economical and effective relay system for a multi-path interference removing using by same channel frequency. What is needed is such a system that supplies appropriate levels of relay system for a multi-path interference removing using by same channel frequency.

DISCLOSURE OF INVENTION

Accordingly, an object of the present invention is to overcome the above problems encountered in the conventional art with reference to accompanying drawings which are given only by way of illustration and thus are not limitative of the present invention.

The approach purposely overcomes extension of service coverage and a dead spot with amplification of same channel frequency. There is a problem of a same channel frequency interference from RF (Radio Frequency) feedback to radiate from tx antenna to rx antenna of the relay system in a wireless relay system. The present invention is to overcome same channel frequency interference, and provides the wireless relay system apparatus and method effectively eliminates the same frequency interference so that it can ensure an additional system gain and easy to set up relatively to general same frequency relay system.

The present invention of a wireless relay system apparatus and method for a multi-path interference removing using by same channel frequency can be more fully described in the detailed specification, which follows.

BRIEF DESCRIPTION OF THE DRAWINGS

The present invention will become better understand with reference to accompanying drawings which are given only by way of illustration and thus are not limitative of the present invention, wherein.

Figure 1:
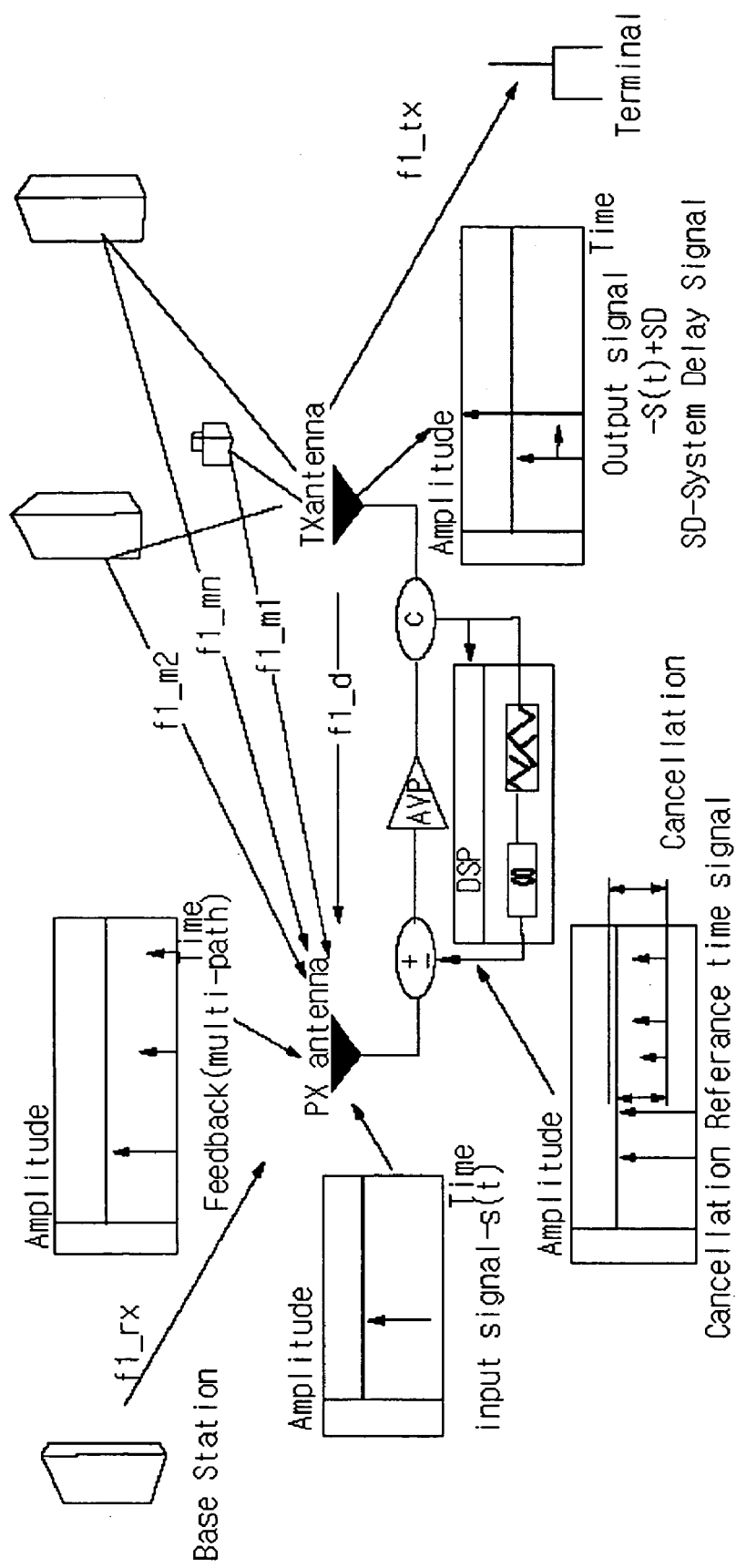
FIG. 1 is a flowchart of wireless relay system with same channel frequency for multi-path interference removing according to the invention.

The Code in Figures Stands For:
10: rx (reception) antenna
20: rx band pass filter
30: rx low noise amplifier
40: rx down converter
41: reference down converter
50: digital signal process
51: interference cancellation controller
52: analog to digital converter
53: digital to analog converter
60: rx up converter
70: linear power amplifier
80: tx (transmission) band pass filter
90: tx antenna
100: monitoring coupler
fl_rx: relay station donor antenna input signal fl_tx: relay station service antenna input signal
fl_d: directly interference signal
fl_m1: multi-path same frequency interference signal 1
fl_m2: multi-path same frequency interference signal 2
fl_mn: multi-path same frequency interference signal n

BEST MODE FOR CARRYING OUT THE
INVENTION

Composition of Invention

Referring to the Figures, there are shown several, but not the only, embodiments of the present invention wireless relay system apparatus and method for a multi-path interference removing using by same channel frequency.

Figure 2:
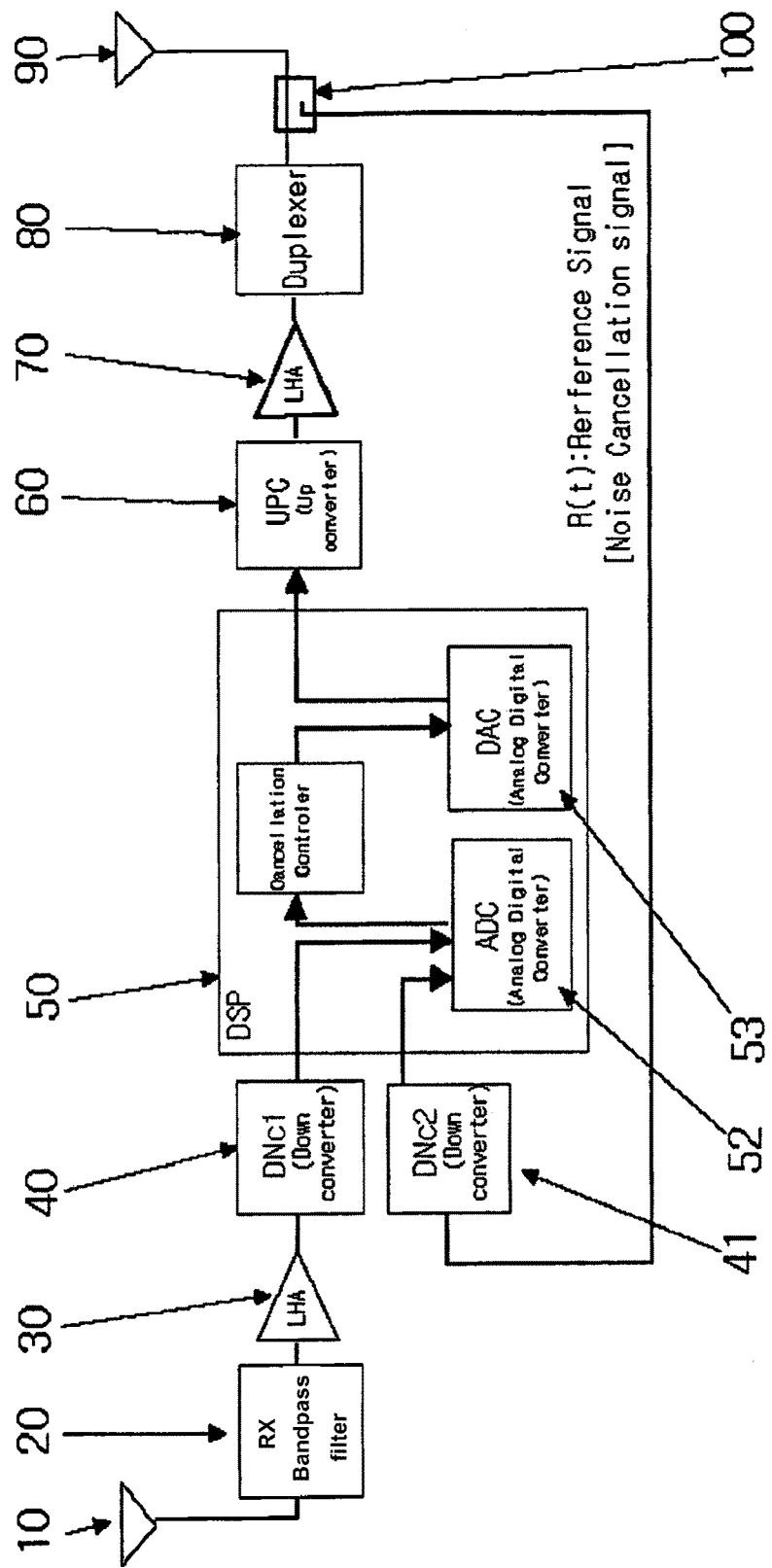
FIG. 2 is a schematic diagram of same channel frequency wireless relay system apparatus according to the invention.

In a wireless replay system using by same channel frequency, as shown FIG. 1, which illustrate in outline of a wireless relay system for a multi-path interference removing that receives fl_rx signal from base wireless station to rx antenna (10) of a replay site as shown FIG. 2 in the present invention, and amplified signal is passed by rx down converter (40) through rx low noise amplifier (30) as needed input RF received signal through rx band pass filter (20) to pass only received signal, then eliminates interference signal with using a digital signal process (50) which converts to IF frequency that can process digital signal, and then process linear power amplifier (70) to convert an interference removing IF signal to RF through rx up converter (60), and then finally amplify and radiate transmitted RF signal through tx band pass filter (80) and tx antenna (90).

An output which is emitted through tx antenna (90) as in FIG. 1, it is provided a service emitted by frequency named fl_tx to terminal, but some tx antenna which is emitted from tx antenna itself, same channel frequency to rx antenna, and fl_d (same frequency direct route) and multi-path interference frequency of fl_m1~fl_mn to rx antenna, which is inputted to become cause of feedback eruption.

To remove fl_d, fl_m1~fl_mn's interference that is same channel frequency interference as above mentioned, output that rx antenna (90) with FIG. 2 is discharged is converted to digital signal being approved to ADC (Analog to Digital Converter) (52) in digital signal process (50) receiving rx antenna or emitted some signal by reference signal IF converter (41) because do coupling (30 dBs diminution signal) through monitoring coupler (100) and analyze time delay of each same channel multi-path interference signal in interference cancellation controller (51) using the changed digital signal, and amplitude creates signal that have reverse-phase of equal signal with time delay such as multi-path interference sign of each fl_d, fl_m1~fl_mn hereupon with the construed signal ingredient.

Also, reception signal pass-band filter (20), rx low noise amplifier (30), and reception signal IF converter (rx down converter) (40) through via several device elements in wireless relay system which is inputted base wireless station signal fl_rx and multi-path interference signal fl_d, fl_m1~fl_mn which is inputted through rx antenna (10), that convert to digital signal by ADC (Analog to Digital Converter) (52) within digital signal process (50), and interference signal in the converted signal fl_rx, fl_d, and fl_m1 through fl_mn excepting fl_rx have reference signal is summing by digital signal fl_d and fl_m1 through fl_mn with having same time delay, and amplitude so that it can get rid of multi-path same frequency interference signal.

Figure 5:
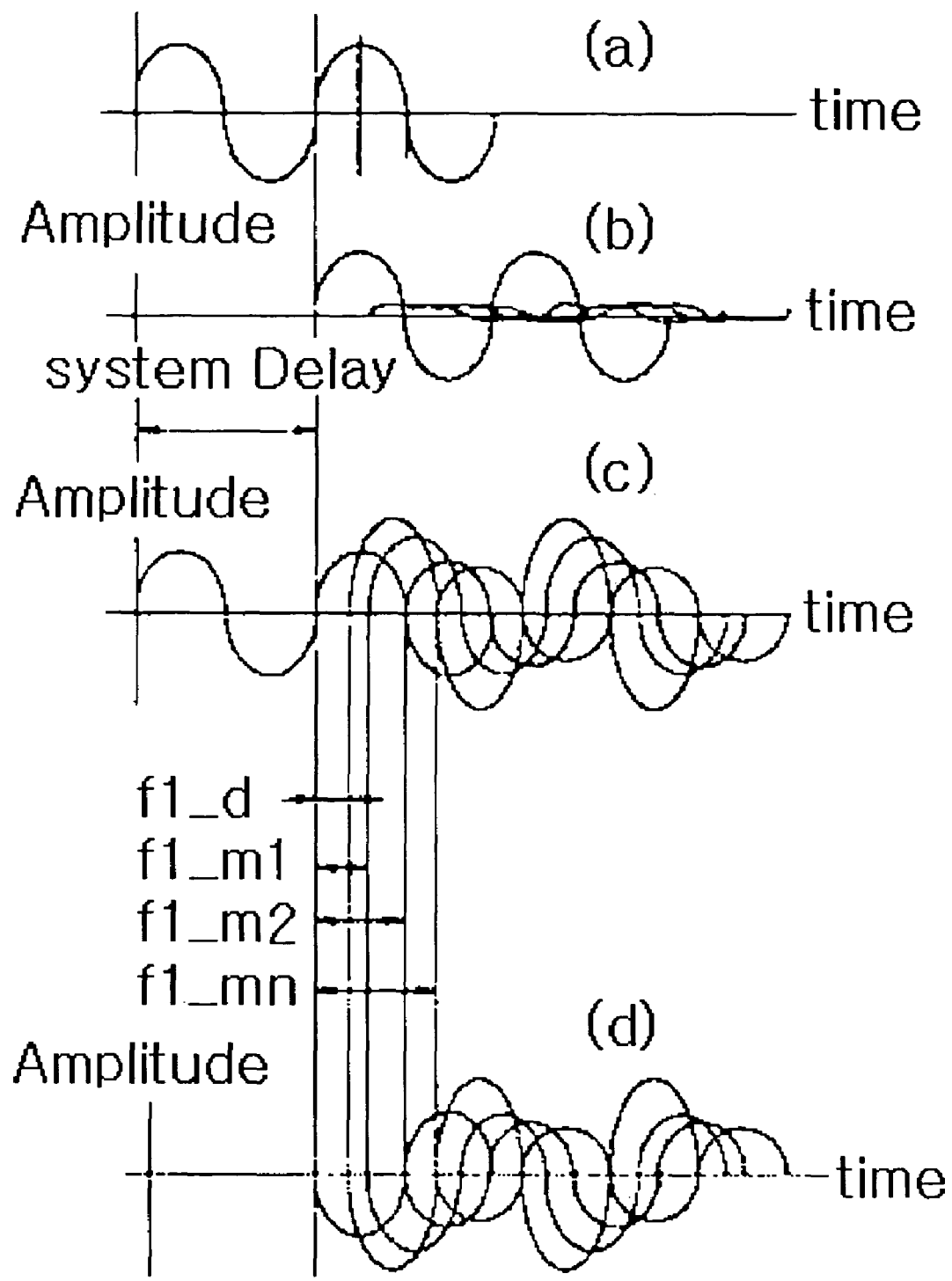
FIG. 5 is an application example of same frequency interference removing according to the invention.

As illustrated to FIG. 5 for detailed explanation of this invention, base wireless station signal as named fl_rx of a) is reception signal and pure base wireless station signal without inputted interference to rx antenna and does not exist transmission of the output of relay station feedback reception signal, and there is output that interference removing relay station transmission of the output signals fl_tx signal of b) removes same channel multi-path interference of relay and multi-path interference signal of c) is reception signal fl_rx signal and signal that multi-path interference signal is included that is inputted from base wireless station. For removing the signal, multi-path interference signal except fl_rx signal receive reference signal which is coupling signal for removing of the signal in tx antenna and reverse-phase of equal amplitude of d) which is the same such as time delay creation signal for interference removing create and absorbs and gets rid of interference signal.

As the prevent invention, if compare fl_rx reception frequency with fl_tx, it can be as the same channel frequency in case of frequency, but it can be registered to differ as following in case of time.

$$fl\_tx = fl\_rx + \text{device system delay time} \tag{a}$$

A signal fl_rx which is received to fl_tx frequency and rx antenna (10) emitted through tx antenna (90), the fl_rx signal can be analyzed by other signal in excepted signal in device system delay time, and the device system delay time refers to amount that become signal delay flowing wireless relay system, and is delayed about minimum number us by saw filter and so on in device. Multi-path interference signal that is same channel interference the delay time is expressed as follows.

$$fl\_d = fl\_tx + \text{antenna cable delay} + \text{air delay between tx/rx antenna} \tag{b}$$

$$fl\_m1 = fl\_tx + \text{antenna cable delay} + \text{air delay by reflector 1} \tag{c}$$

$$fl\_m2 = fl\_tx + \text{antenna cable delay} + \text{air delay by reflector 2} \tag{d}$$

$$fl\_mn = fl\_tx + \text{antenna cable delay} + \text{air delay by reflector } n \tag{e}$$

If the multi-path interference signal examines in case of time, the multi-path interference signal becomes cause that eruption happens because infinity feedback happens in RF environment with having fl_rx signal and different time delay, and amplitude and phase in rx antenna (10) by being inputted, input signal increase and amplifies into again fixed gain in device and is emitted through tx antenna (90) which is the amplified signal.

Figure 3:
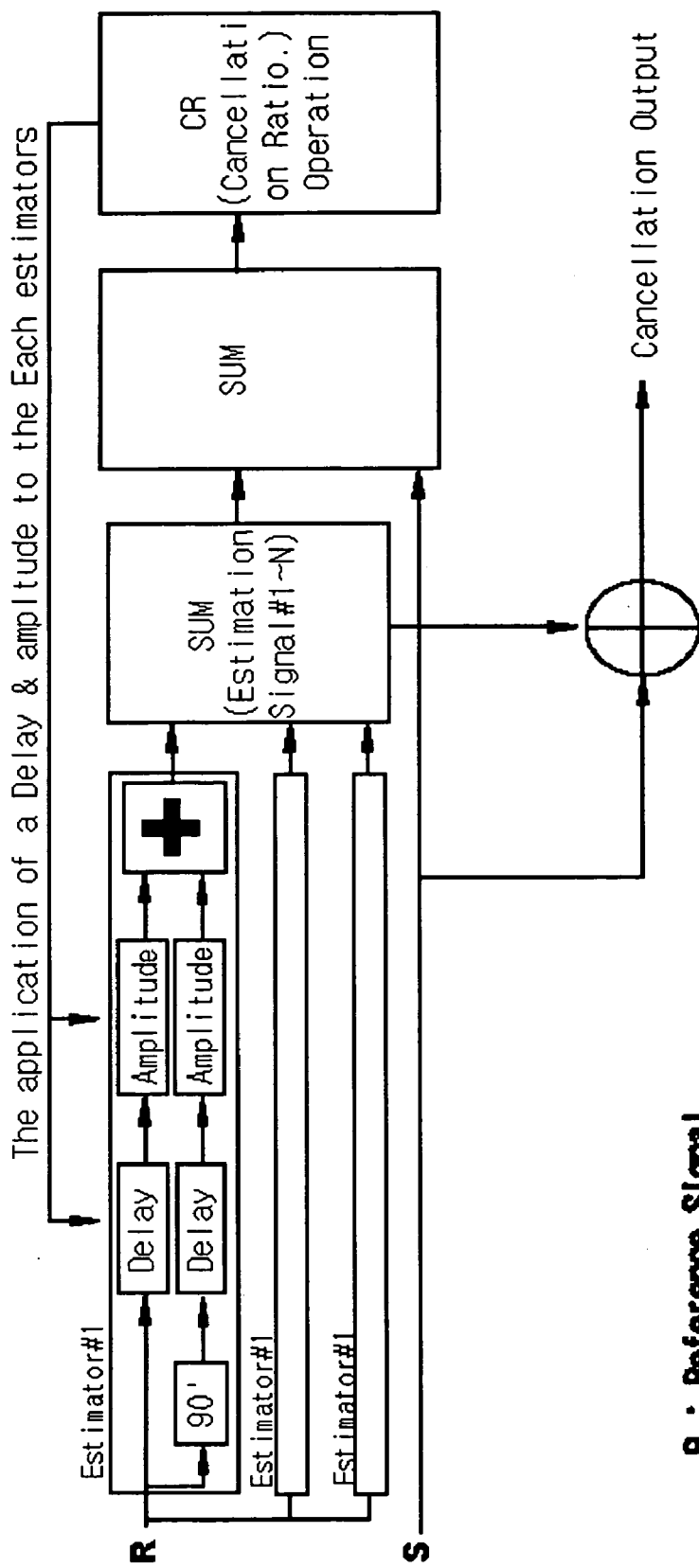
FIG. 3 is a schematic diagram of multi-path interference removing signal process according to the invention.

The multi-path interference removing signal that is summing in reception signal by finding tx antenna (90) which is emitted some by algorithm to have equal time delay detecting time delay that can get rid of interference signal of (b), (c), (d), and (e) that is the multi-path interference signal come in estimator #1 through #N in digital signal process of FIG. 3 receiving some transmission level using monitoring coupler (100) as sees in FIG. 2 to get rid of the multi-path interference signal.

Figure 4:
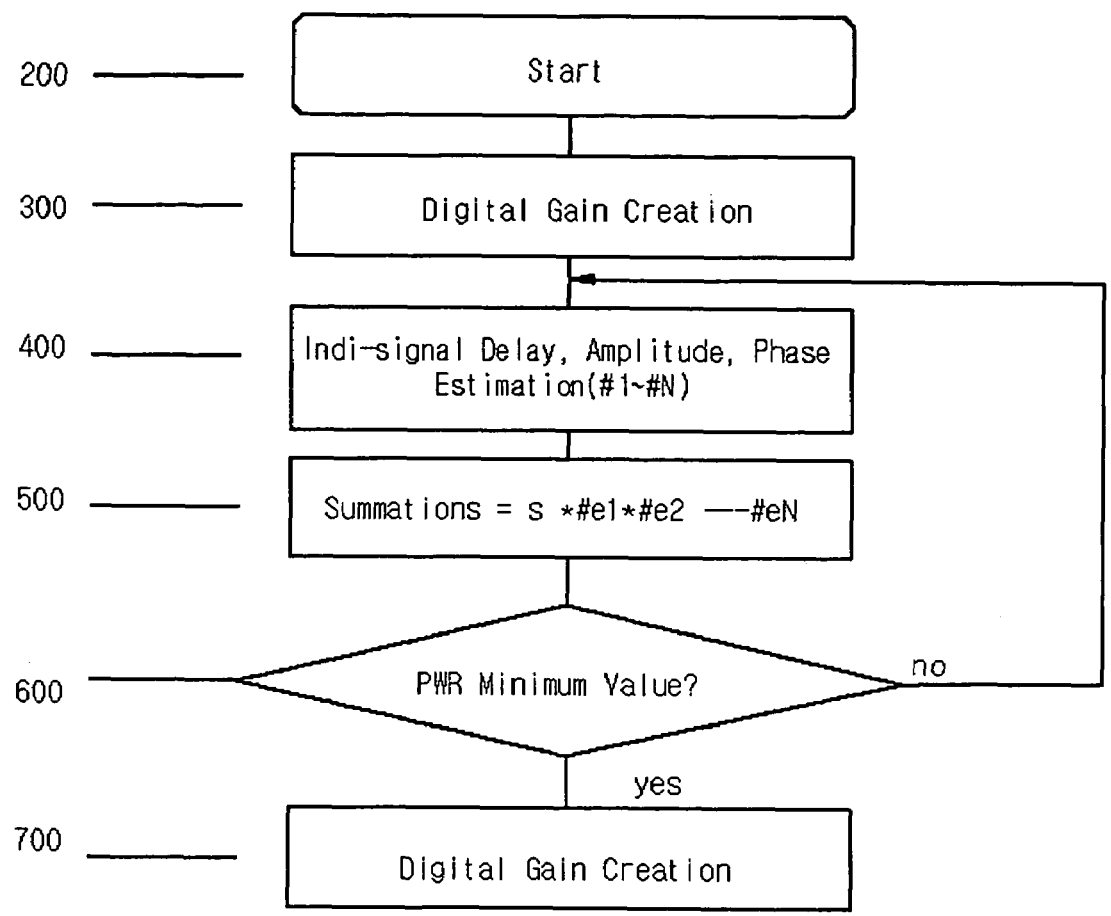
FIG. 4 is a flowchart of multi-path interference removing according to the invention.

Algorithm to get rid of the multi-path interference signal has achieved continuous algorithm action even if optimum algorithm is applied applying the digital signal gains (700) after multiplex interference confirms value that can be minimized judging interference position (600) in relevant estimator through interference position chase (400) and application (500) because the algorithm is accomplished and changes inside digital signal gains of FIG. 3 (300) if power with flowchart of FIG. 4 is approved (200).

Figure 6:
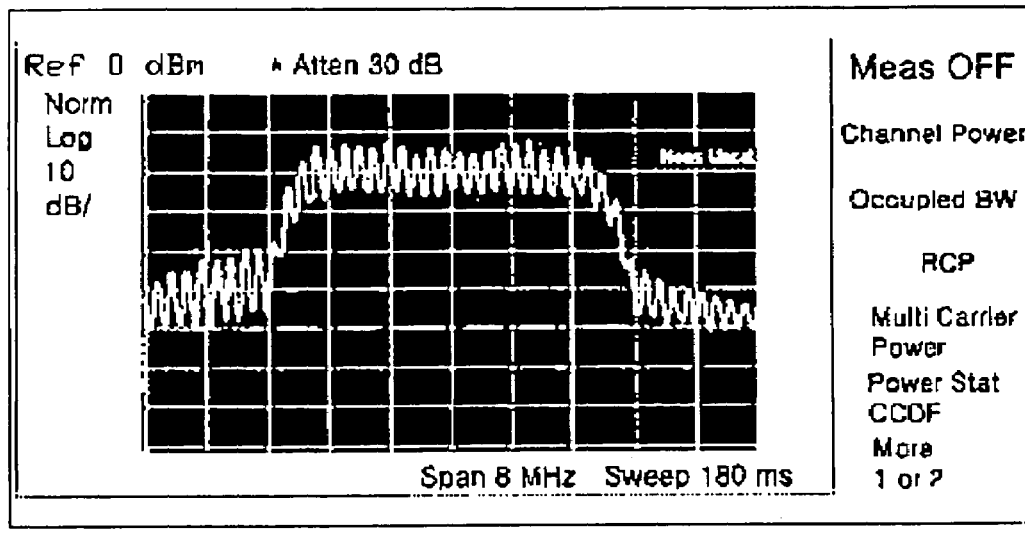
FIG. 6 is another application example of same frequency interference removing according to the invention.
Figure 6:
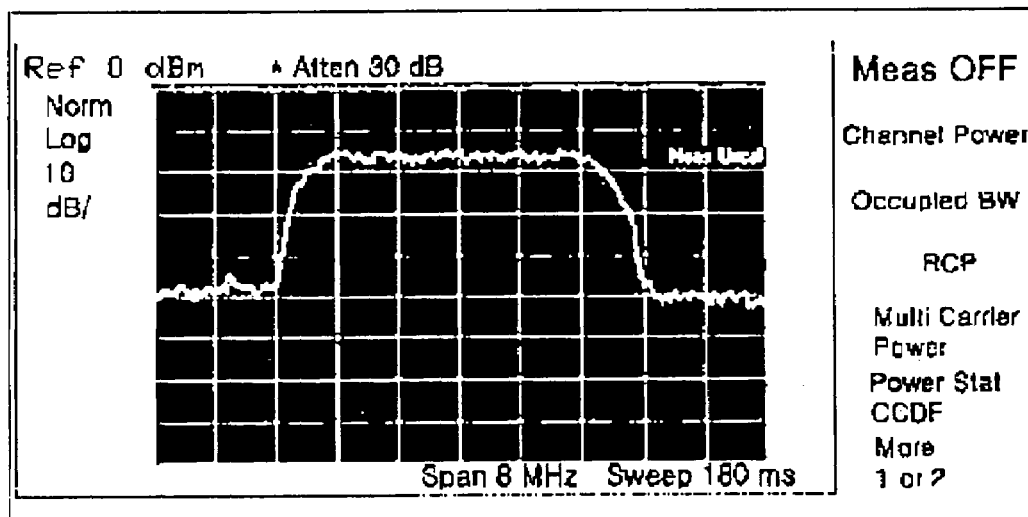

FIG. 6 is that interference signal removing algorithm displays power OFF status and ON status through spectrum analyzer. As in FIG. 6, the result of same frequency interference removing appears definitely through spectrum analyzer.

The present invention is not limited to the above embodiment. As the present invention may be embodied in several forms without departing from the spirit or essential characteristics thereof, it should also be understood that the above-described examples are mot limited by any of the details of the foregoing description, unless otherwise specified, but rather should be constructed broadly within its spirit and scope as defined in the appended claims, and therefore all changes and modifications that fall within the meets and bounds of the claims, or equivalences of such meets and bounds are therefore intended to be embraced by the appended claims.

Effective of Invention

Because this invention such as the can keep separation between send-receive antenna remarkably short removing feedback eruption that happen in relay that signal of high power can do delivery amplifying same channel frequency in communication wide-band by using same channel frequency, establishment is easy and economical than the other relay system and excellent in frequency.

Also, a wireless relay system of the present invention is possible to provide a service by removing many multi-path interference and easy to set up at outdoors of building and telegraph of single pole simply, especially, the area such as outer of downtown, mountains, and shore is that economic performance does not exist to base wireless station as necessary to coverage extension with area.

What is claimed is:

1. A multi-path interference removing apparatus of a wireless relay system using same channel frequency, comprising:
   an rx antenna which is receiving same frequency of wireless channel;
   an rx band pass filter which only passes received signal through the rx antenna;
   an rx low noise amplifier receiving and amplifying RF (Wireless Frequency) signal as needed through the rx band pass filter;
   an rx down converter receiving amplified signal through the rx low noise amplifier and converting the amplified signal to IF frequency;
   a digital signal process which removes interference among the IF frequency received from the rx down converter to form a clear IF signal;
   an rx up converter which converts the clear IF signal to received signal;
   a linear power amplifier which amplifies the received signal;
   a tx band pass filter which is receiving RF signal amplified by the linear power amplifier;
   a tx antenna for radiating the RF signal received from the tx band pass filter for transmitting signal.

2. The multi-path interference removing apparatus of wireless relay system as in claim 1, wherein multi-path interference removing apparatus of wireless relay system using same channel frequency further comprises a generating of feedback for the radiating same channel frequency through the tx antenna, said same channel frequency is receiving multi-path interference frequency in rx antenna, wherein fl_d and fl_ml through fl_mn of interference signal.

3. The multi-path interference removing apparatus of wireless relay system as in claim 1, wherein the digital signal process comprises estimator #1 through #N, and a multi-path interference cancellation controller to be able to eliminate interference signal by mixing in rx with summing to create amplitude and reverse-phase of interference signal to apply algorithm to same time delay for eliminating the interference signal.

4. The multi-path interference removing apparatus of wireless relay system as in claim 3, wherein multi-path interference removing apparatus of wireless relay system using same channel frequency further comprises the detecting time delay algorithm executes with power on, and apply to search for a location of interference in an appropriate estimator to modify a digital signal gain, said applied location of interference is looking for a minimum of the multi-path interference, then consistently to be executed detecting time delay algorithm to apply the digital signal gain.

5. In a wireless relay system for multi-path interference removing method, the wireless relay system method comprising:
   a step 1 in which is coupling through monitoring coupler of emitting output from tx antenna;
   a step 2 in which transmits into rx down converter coupled signal of the step 1;
   a step 3 in which transmits the signal of the rx down converter into digital signal process;
   a step 4 in which converts the transmitted signal from the step 3 into the digital signal from ADC (Analog to Digital Converter);
   a step 5 in which analysis a time delay of a same channel multi-path interference signal from converted digital signal of the step 4 in a interference cancellation controller;
   a step 6 in which creates a reverse-phase of a same amplitude with from analysis signal of the step 5 having the time delay which is the same with the multi-path interference signal;
   a step 7 in which eliminates the multi-path interference signal using by the same channel frequency with summing created reverse-phase signal of the step 6.

6. The multi-path interference removing method of wireless relay system as in claim 5, wherein the same channel multi-path interference signal of said step 5 further comprises:

$$fl\_d = fl\_tx + \text{antenna cable delay} + \text{air delay between tx/rx antenna}$$

$$fl\_m1 = fl\_tx + \text{antenna cable delay} + \text{air delay by reflector}$$

$$fl\_m2 = fl\_tx + \text{antenna cable delay} + \text{air delay by reflector 2}$$

$$fl\_mn = fl\_tx + \text{antenna cable delay} + \text{air delay by reflector } n.$$

7. The multi-path interference removing method of wireless relay system as in claim 5, wherein multi-path interference signal using by same channel frequency further comprising said step 6 creates an interference signal to calculate time delay of multi-path interference signal, and creates a reverse-phase, which is consisting of amplitude and 180 degree of the interference signal.

8. The multi-path interference removing method of wireless relay system as in claim 5, wherein multi-path interference signal using by same channel frequency further comprising said step 7 executes algorithm if power on using algorithm of detecting time delay, then apply to search for a location of interference in an appropriate estimator to modify a digital signal gain, and then check the applied location of interference, which is looking for a minimum of the multi-path interference, and then consistently to be executed detecting time delay algorithm to apply the digital signal gain, so that eliminates multi-path interference with summing of generating confirmed interference, same amplitude, and reverse-phase.

* * * * *